United States Patent
Lu

(10) Patent No.: US 11,949,503 B2
(45) Date of Patent: Apr. 2, 2024

(54) INDICATION METHOD OF DATA COPYING MODE, DEVICE AND STORAGE MEDIUM

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 518 days.

(21) Appl. No.: 17/187,611

(22) Filed: Feb. 26, 2021

(65) Prior Publication Data

US 2021/0184788 A1 Jun. 17, 2021

Related U.S. Application Data

(63) Continuation of application No. PCT/CN2018/121837, filed on Dec. 18, 2018.

(51) Int. Cl.
*H04L 1/00* (2006.01)
*H04L 1/08* (2006.01)
(Continued)

(52) U.S. Cl.
CPC ....... *H04L 1/0025* (2013.01); *H04W 28/0268* (2013.01); *H04W 72/23* (2023.01);
(Continued)

(58) Field of Classification Search
CPC ....... H04L 1/0025; H04L 1/08; H04L 5/0098; H04L 5/001; H04W 28/0268; H04W 72/23; H04W 76/15; H04W 76/27; H04W 80/02; H04W 24/02; H04W 28/06; H04W 8/24; H04W 28/04
See application file for complete search history.

(56) References Cited

U.S. PATENT DOCUMENTS

2018/0227793 A1 8/2018 Kim et al.
2018/0324642 A1 11/2018 Yu et al.
(Continued)

FOREIGN PATENT DOCUMENTS

CN 107241164 A 10/2017
CN 108632809 A 10/2018
(Continued)

OTHER PUBLICATIONS

Decision of Refusal for Japanese Application No. 2021-520136 dated Oct. 7, 2022. 7 pages with English translation.
(Continued)

*Primary Examiner* — Harry H Kim
(74) *Attorney, Agent, or Firm* — PERKINS COIE LLP

(57) ABSTRACT

Disclosed is an indication method of data copying mode, including: receiving, by a terminal device, first indication information sent by a network device, wherein the first indication information is used to indicate the data copy mode to change. Or, the terminal device determines that the data copying mode is changed, and/or determines that the data copying mode is activated/deactivated. Further disclosed are another indication method of data copying mode, the terminal device, the network device, and a storage medium.

3 Claims, 4 Drawing Sheets

A UE receives first indication information sent by a network device, wherein the first indication information is used for indicating to change a data duplication mode — S201

(51) Int. Cl.
| | |
|---|---|
| *H04L 5/00* | (2006.01) |
| *H04W 8/24* | (2009.01) |
| *H04W 24/04* | (2009.01) |
| *H04W 28/02* | (2009.01) |
| *H04W 28/06* | (2009.01) |
| *H04W 72/23* | (2023.01) |
| *H04W 76/15* | (2018.01) |
| *H04W 76/27* | (2018.01) |
| *H04W 80/02* | (2009.01) |

(52) U.S. Cl.
CPC ........... *H04W 76/15* (2018.02); *H04W 76/27* (2018.02); *H04W 80/02* (2013.01)

(56) References Cited

U.S. PATENT DOCUMENTS

| | | | |
|---|---|---|---|
| 2020/0052826 A1* | 2/2020 | Han | H04W 76/15 |
| 2020/0137673 A1* | 4/2020 | Shikari | H04W 72/542 |
| 2020/0186292 A1* | 6/2020 | Zou | H04W 76/15 |

FOREIGN PATENT DOCUMENTS

| | | |
|---|---|---|
| CN | 108810990 A | 11/2018 |
| CN | 108811175 A | 11/2018 |
| EP | 3637852 A1 | 4/2020 |
| WO | 2018059557 A1 | 4/2018 |
| WO | 2018143600 A1 | 8/2018 |
| WO | 2018202198 A1 | 11/2018 |
| WO | 2020088771 A1 | 5/2020 |

OTHER PUBLICATIONS

First Office Action for Chinese Application No. 202110429103.X dated Aug. 19, 2022. 18 pages with English translation.
No Author. Korean Application No. 10-2021-7010753-KR Notice of Preliminary Rejection dated Dec. 22, 2022, pp. 1-8.
Apple et al. "LCH-to-cell Restriction for CA Duplication Deactivation" R2-1912461; 3GPP TSG-RAN WG2 Meeting #107bis; Oct. 14-18, 2019. 4 pages.
Ericsson "Resource efficient data duplication" Tdoc R2-1814814; 3GPP TSG-RAN WG2 #103bis; Oct. 8-12, 2018. 2 pages.
Extended European Search Report for European Application No. 18943441.8 dated Sep. 9, 2021. 10 pages.
International Search Report dated Aug. 29, 2019 cited in PCT/CN2018/121837.
Examination Report for Indian Application No. 202127015254 dated Feb. 11, 2022. 5 pages with English translation.
Examination Report No. 1 for Australian Application No. 2018453228 dated Dec. 1, 2021. 3 pages.
Examination Report for European Application No. 18943441.8 dated May 23, 2022. 6 pages.
Huawei et al. "Activating and deactivating packet duplication" R2-1703529; 3GPP TSG-RAN2 #97bis; Spokane, WA, USA; Apr. 3-7, 2017. 5 pages.
Nokia et al. "On PDCP Duplication Enhancements with Combination of DC and CA" R2-1817583; 3GPP TSG RAN WG2 Meeting #104; Spokane, USA; Nov. 12-16, 2018. 8 pages.
Notice of Reasons for Refusal for Japanese Application No. 2021-520136 dated Apr. 22, 2022. 6 pages with English translation.
Notification of Reason for Refusal for Korean Application No. 10-2021-7010753 dated Apr. 14, 2022. 8 pages with English translation.

* cited by examiner

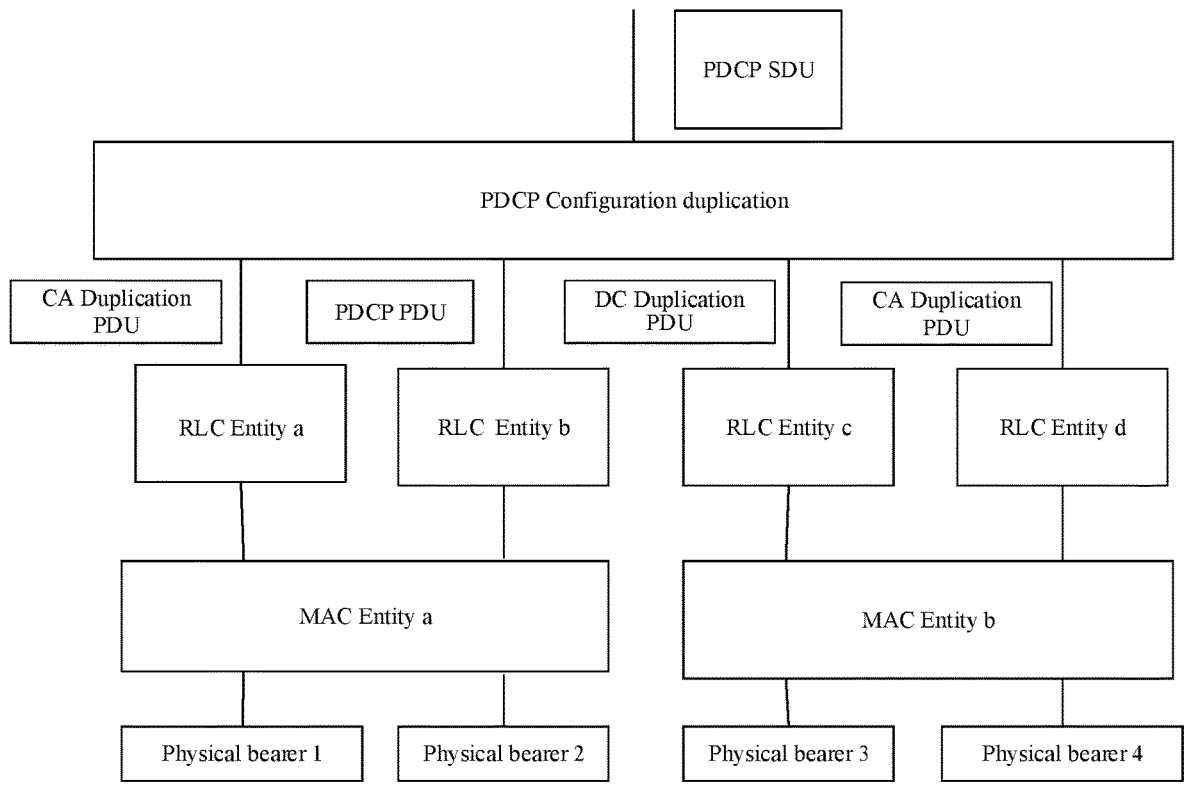
FIG. 1
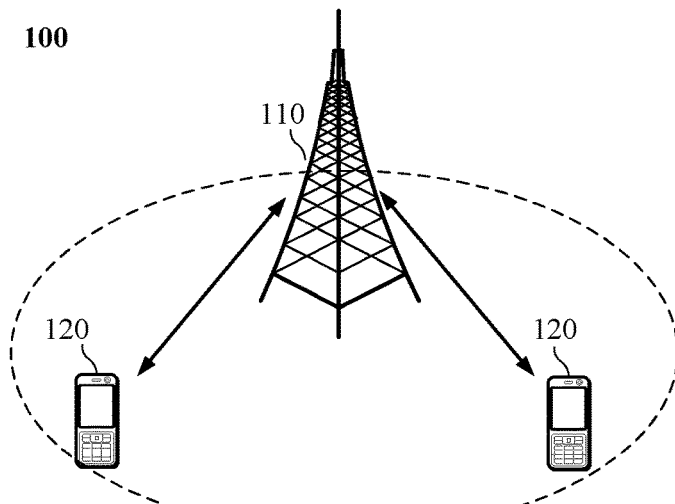
FIG. 2
| A UE receives first indication information sent by a network device, wherein the first indication information is used for indicating to change a data duplication mode | S201 |
FIG. 3

INDICATION METHOD OF DATA COPYING MODE, DEVICE AND STORAGE MEDIUM

CROSS-REFERENCE TO RELATED APPLICATION

The present application is a continuation application of International PCT Application No. PCT/CN2018/121837, filed on Dec. 18, 2018, the entire content of which is hereby incorporated by reference.

TECHNICAL FIELD

The present disclosure relates to the technical field of wireless communication, and in particular, to an indication method of data duplication mode, a device and a storage medium.

BACKGROUND

In related technologies, in order to improve the transmission performance of ultra-reliable low latency communication (URLLC) services, a data duplication function is introduced. The transmission of duplicated data is implemented using three modes, i.e., carrier aggregation (CA), dual connectivity (DC), or a combination of CA and DC. However, at present there is no effective solution about how user equipment (UE) can know the current data duplication mode when the data duplication mode changes.

SUMMARY

To solve the above technical problems, implementations of the present disclosure provides an indication method of data duplication mode, a device and a storage medium, so that a UE and/or a network device can know the current data duplication mode.

In a first aspect, an implementation of the present disclosure provides an indication method of data duplication mode, including:
  a UE receiving first indication information sent by a network device, wherein the first indication information is used for indicating to change a data duplication mode.

In a second aspect, an implementation of the present disclosure provides an indication method of data duplication mode, including: a UE determining to change a data duplication mode and/or determining to activate/deactivate the data duplication mode.

In a third aspect, an implementation of the present disclosure provides an indication method of data duplication mode, including: a network device sending first indication information to a UE, wherein the first indication information is used for indicating to change a data duplication mode.

In a fourth aspect, an implementation of the present disclosure provides an indication method of data duplication mode, including: a network device receiving fifth indication information sent by a UE, wherein the fifth indication information is used for indicating to change a data duplication mode and/or to activate/deactivate the data duplication mode.

In a fifth aspect, an implementation of the present disclosure provides a terminal device including: a first receiving unit configured to receive first indication information sent by a network device, wherein the first indication information is used for indicating to change a data duplication mode.

In a sixth aspect, an implementation of the present disclosure provides a terminal device including:
  a second processing unit configured to determine to change a data duplication mode and/or determine to activate/deactivate the data duplication mode.

In a seventh aspect, an implementation of the present disclosure provides a network device including:
  a second sending unit configured to send first indication information to a UE, wherein the first indication information is used for indicating a change in a data duplication mode.

In an eighth aspect, an implementation of the present disclosure provides a network device including:
  a second receiving unit configured to receive fifth indication information sent by a UE, wherein the fifth indication information is used for indicating to change a data duplication mode and/or to activate/deactivate the data duplication mode.

In a ninth aspect, an implementation of the present disclosure provides a terminal device including a processor and a memory configured to store a computer program that is runnable on the processor, wherein the processor is configured to execute acts of the above indication method of data duplication mode executed by the terminal device when running the computer program.

In a tenth aspect, an implementation of the present disclosure provides a storage medium configured to store an executable program, which, when executed by a processor, implements the above indication method of data duplication mode executed by the network device.

According to the indication method of data duplication mode provided by the implementations of the present disclosure, the UE receives the first indication information sent by the network device for indicating to change the data duplication mode; and the UE independently determines to change the data duplication mode, and/or the UE independently determines to activate/deactivate the data duplication mode, and notifies the network device of the determined or changed data duplication mode, such that the network device and/or UE can know the current data duplication mode.

BRIEF DESCRIPTION OF DRAWINGS

FIG. 1 is a schematic flowchart of a processing of data duplication transmission based on a combination of CA and DC;

FIG. 2 is a schematic structural diagram of a communication system of an implementation of the present disclosure;

FIG. 3 is a schematic flowchart of an optional processing of an indication method of data duplication mode applied to a terminal device of an implementation of the present disclosure;

DETAILED DESCRIPTION

Figure 4:
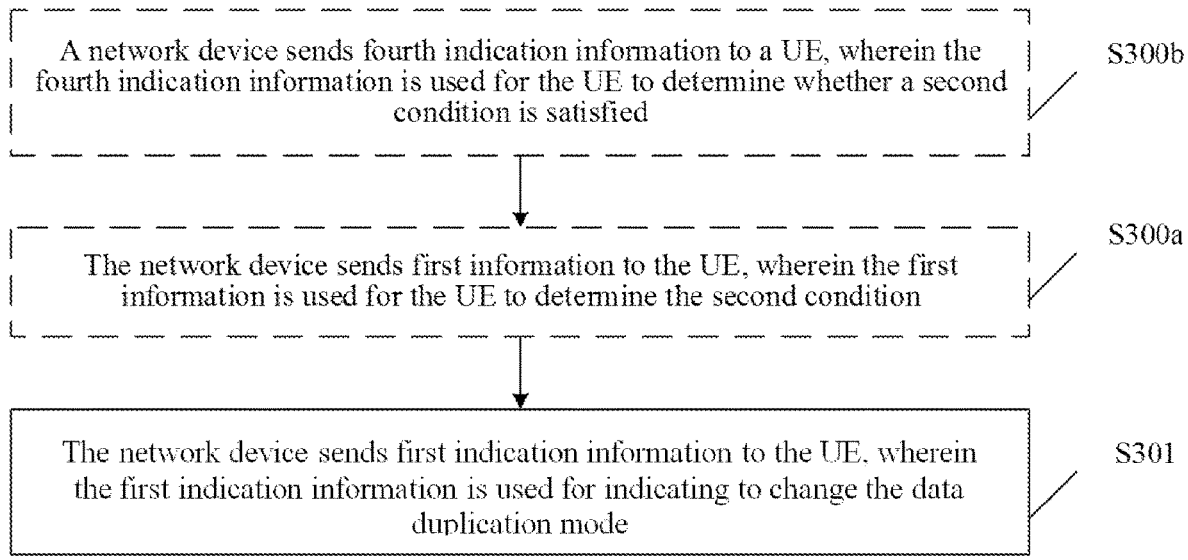
FIG. 4 is a schematic flowchart of an optional processing of an indication method of data duplication mode applied to a network device of an implementation of the present disclosure.

In order to understand features and technical contents of implementations of the present disclosure in more detail, implementations of the implementations of the present disclosure will be described in detail below with reference to the accompanying drawings, which are used for reference only and are not intended to limit the implementations of the present disclosure.

Before describing the implementations of the present disclosure in detail, firstly, the data duplication in related technologies will be briefly explained. A data duplication function is introduced in Rel-15 (Release 15) to improve the transmission performance of URLLC services. Specifically, the transmission of duplicated data can be implemented using a mode of carrier aggregation (CA) or dual connectivity (DC).

For a scenario of the CA, transmission for data duplication is supported by using the data duplication function of PDCP (Packet Data Convergence Protocol), such that the duplicated PDCP PDUs (Protocol Data Units) are respectively transmitted to two radio link control (RLC) entities, i.e., two different logical channels; and it is finally ensured that the duplicated PDCP PDUs can be transmitted on aggregated carriers at different physical layers, so as to achieve a frequency diversity gain to improve the reliability of data transmission.

For a scenario of the DC, data duplication is supported by using the data duplication function of PDCP, such that the duplicated PDCP PDUs are respectively transmitted to two RLC entities, which correspond to different media access control (MAC) entities respectively.

In Rel-16 NR, a data duplication technology based on a combination of the CA and DC can be adopted. A processing flow of transmission for data duplication based on the combination of the CA and DC is shown in FIG. 1, thus, the reliability of data transmission and resource utilization are improved. In order to effectively reduce waste of resources and ensuring the system performance of transmission while ensuring the performance of URLLC services, an implementation of the present disclosure proposes that a first activation and deactivation indication mode or trigger mode can be adopted to support a UE to transmit data on multiple RLC entities corresponding to one PDCP entity. A granularity of such data duplication mode can be based on data resource bearer (DRB) between the UE and a network device, or on QoS (Quality of Service) flow, or on service, or on packet.

However, the applicant found that in a specific scenario, a data transmission mode used in the current scenario is no longer applicable, that is, the data duplication or transmission mode for data duplication used in the current scenario is no longer applicable. The attendant problem is that when the data duplication mode is changed, the UE or the network device cannot know the changed data duplication mode.

In order to solve the problem described above, the present disclosure provides an indication method of data duplication mode. The indication method of data duplication mode of the implementation of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, a LTE Time Division Duplex (TDD) system, a Universal Mobile Telecommunications System (UMTS), a Worldwide Interoperability for Microwave Access (WiMAX) communication system, a 5G system or the like.

Illustratively, a communication system 100 applied in an implementation of the present disclosure is shown in FIG. 2. The communication system 100 may include a network device 110. The network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN), or the network device may be a mobile switch center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage range of the network device 110. The "terminal device" as used herein includes, but not limited to, a device configured to be connected via a wired circuit, for example, via a public switched telephone network (PSTN), a digital subscriber line (DSL), a digital cable, a direct cable; and/or another data connection/network; and/or via a wireless interface, for instance, for a cellular network, a wireless local area network (WLAN), a digital television network such as a handheld digital video broadcasting-handheld (DVB-H) network, a satellite network, and an amplitude modulation-frequency modulation (AM-FM) broadcast transmitter; and/or an apparatus of another terminal device configured to receive/transmit communication signals; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular phone, a personal communication system (PCS) terminal capable of combining a cellular wireless phone with data processing, faxing, and data communication abilities, a Personal Digital Assistant (PDA) that may include a radio phone, a pager, an internet/intranet access, a Web browser, a memo pad, a calendar, and/or a Global Positioning System (GPS) receiver, and a conventional laptop and/or palmtop receiver or another electronic apparatus including a radio phone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), or the like.

Optionally, device to device (D2D) communication may be performed between the terminal devices 120.

Optionally, the 5G system or 5G network may be referred to as a New Radio (NR) system or a NR network.

FIG. 2 illustrates one network device and two terminal devices as an example. Optionally, the communication system 100 may include multiple network devices, and other numbers of terminal devices may be included within the coverage range of each network device, and the implementations of the present disclosure are not limited thereto.

Optionally, the communication system 100 may further include other network entities, such as a network controller and a mobile management entity, and the implementations of the present disclosure are not limited thereto.

It should be understood that a device with a communication function in a network/system in an implementation of the present disclosure may be referred to as a communication device. Taking the communication system 100 shown in FIG. 2 as an example, the communication device may include a network device 110 and a terminal device 120 which have communication functions, and the network device 110 and the terminal device 120 may be the specific devices described above, and will not be repeated herein. The communication device may also include other devices in the communication system 100, such as other network entities, such as network controllers and mobile management entities, and the implementations of the present disclosure are not limited thereto.

As shown in FIG. 3, an optional processing flow of an indication method of data duplication mode applied to a terminal device provided by an implementation of the present disclosure includes the following act:

S201, a UE receives first indication information sent by a network device, wherein the first indication information is used for indicating to change a data duplication mode.

In an implementation of the present disclosure, the data duplication mode includes a first activation/deactivation mode and a second activation/deactivation mode. Accordingly, the change in the data duplication mode is: that the data duplication mode is changed from the first activation/deactivation mode to the second activation/deactivation mode; or that the data duplication mode is changed from the second activation/deactivation mode to the first activation/deactivation mode; or that the data duplication mode is changed from a first sub-data duplication mode to a second sub-data duplication mode in the first activation/deactivation mode; or that the data duplication mode is changed from a third sub-data duplication mode to a fourth sub-data duplication mode in the second activation/deactivation mode.

Here, the first activation/deactivation mode refers to a data duplication mode in which CA is combined with DC. The second activation/deactivation mode refers to a data duplication mode of the CA or a data duplication mode of the DC. The data duplication mode in which the CA is combined with the DC or the data duplication mode of the CA or the data duplication mode of the DC can also be a packet-based data duplication mode, a service-based data duplication mode, a bearer-based data duplication mode, a QoS flow-based data duplication mode or a UE-based data duplication mode.

The first activation/deactivation mode includes at least one of the following: the packet-based data duplication mode, the service-based data duplication mode, the QoS flow-based data duplication mode and the UE-based data duplication mode. The second activation/deactivation mode includes a DRB-based data duplication mode. It can be understood that the first sub-data duplication mode and the second sub-data duplication mode in the first activation/deactivation mode are any two of the packet-based data duplication mode, the service-based data duplication mode, the QoS flow-based data duplication mode and the UE-based data duplication mode. When the first sub-data duplication mode is the QoS flow-based data duplication mode and the second sub-data duplication mode is the service-based data duplication mode, the QoS flow-based data duplication mode is changed to the service-based data duplication mode.

In a specific implementation, the UE determines, by receiving granularity indication information sent by the network device, whether the first activation/deactivation mode is based on packet, or on service, or on QoS flow or on UE. The granularity indication information includes at least one of QoS flow Indication (QFI), service identification information and cross-layer indication.

In some implementations, the first indication information is sent by the network device to the UE when a first condition is satisfied. The first condition includes at least one of the following: that configuration of a data or signaling bearer is changed, that a service bearer is changed, that a service is changed, that the network device receives second indication information sent by a core network element, that the network device receives third indication information sent by the UE, that a service starts, that a service ends and that a change period of the data duplication mode is reached.

In the above, the service being changed can be one or more of that a service type is changed, that service QoS is changed, that service identification is changed and that a service priority is changed.

For example, when the first condition is that the configuration of the data or signaling bearer is changed, that is, when the network device reconfigures the data or signaling bearer, the network device indicates to the UE that a change occurs in the data duplication mode. When the first condition is that the service is changed, that is, when the network device knows that the service is changed, the network device indicates to the UE that a change occurs in the data duplication mode. When the first condition is that the service bearer is changed, that is, when the network device knows that the service bearer is changed, the network device indicates to the UE that a change occurs in the data duplication mode. Here, the service is at least one of the following applications: a high reliability and low delay service, an industrial Internet of Things service, a vertical industry service, an Internet of Vehicles service, a time sensitive network service and an Enhanced Mobile Broadband (eMBB) service.

In an implementation of the present disclosure, the second indication information is used for indicating a change in the data duplication mode between the network device and the UE. In the above, a granularity of the change in the data duplication mode can be based on UE, or on service bearer, or on QoS flow or on packet. For example, the second indication information is used for indicating that the data duplication mode between the network device and the UE is changed from the UE-based data duplication mode to the packet-based data duplication mode.

In an implementation of the present disclosure, the third indication information is used for indicating a change in the data duplication mode between the network device and the UE. In the above, the granularity of the change in the data duplication mode can be based on UE, or on service bearer, or on QoS flow or on packet. For example, the third indication information is used for indicating that the data duplication mode between the network device and the UE is changed from the QoS flow-based data duplication mode to the UE-based data duplication mode. Or, the third indication information is used for indicating activation/deactivation of the data duplication mode between the network device and the UE. For example, the third indication information is used for indicating that the data duplication mode between the network device and the UE is activated, that is, the network device and the UE are changed from not performing data duplication to performing data duplication; or the third indication information is used for indicating that the data duplication mode between the network device and the UE is deactivated, that is, the network device and the UE are changed from performing data duplication to not performing data duplication.

Here, each of the second indication information and the third indication information can take a UE as the granularity, take a bearer as the granularity, take a QoS flow as the granularity, take a packet as the granularity or take a service as the granularity. The second indication information and the third indication information may have the same granularity or different granularities. For example, the second indication information takes a UE as the granularity, the third indication information takes a packet as the granularity, or each of the second indication information and the third indication information takes a QoS flow as the granularity.

The UE sends the third indication information to the network device when the third indication information satisfies a second condition; and/or the third indication information is sent to the network device after the UE receives fourth indication information sent by the network device; and/or the third indication information is sent after the UE receives the fourth indication information sent by the network device and when the second condition is satisfied. In the above, the second condition includes any one of the following: that a service pattern is changed, that a service starts or a service ends, that a channel quality is less than a first threshold value, that the channel quality is greater than or equal to the first threshold value, that designated traffic to be transmitted is less than a second threshold value and that the designated traffic to be transmitted is greater than or equal to the second threshold value. For example, when the second condition is that the service pattern is changed, when a tolerable latency length of the service is longer, such as when a latency tolerance increases from 1 ms to 10 ms, it indicates that the service pattern is changed, and the UE sends the third indication information to the network device. The second condition may also be the at least one of that the service type is changed, that the service QoS is changed, that that service identification is changed and that service priority is changed.

In the above, the second condition is determined by the UE according to first information sent by the network device. The first information includes at least one of the following: a trigger condition, a reference object, a reference signal type, a measurement object and a threshold value. The trigger condition can be triggering periodically, triggering periodically when the second condition is satisfied, or triggering periodically when the second condition is satisfied repeatedly. The reference object can be service, such as service type, traffic or service pattern, or channel quality. The reference signal type may be SS/PBCH Block (SSB), channel state information (CSI), reference signal (RS), or sounding reference signal (SRS). The measurement object can be reference signal receiving power (RSRP), reference signal receiving quality (RSRQ), received signal strength indication (RSSI), or signal to interference plus noise ratio (SINR). For example, when the first information sent by the network device to the UE is that a specific service starts or ends, the UE determines that the second condition is that the service starts or the service ends. When the first information sent by the network device to the UE is that the RSRP based on SSB is less than the threshold value, the UE determines that the second condition is that the channel quality is less than the first threshold value. When the first information sent by the network device to the UE is that the specific service pattern is changed and the traffic is less than the threshold value, the UE determines that the second condition is that the service pattern is changed and the service information.

In some implementations, the UE determines whether the second condition is satisfied according to the fourth indication information sent by the network device. When the UE determines according to the fourth indication information that the second condition needs to be satisfied, and then determines whether the second condition is satisfied, and the UE sends the third indication information to the network device when determining that the second condition is satisfied. Evidently, in other implementations, the UE may also directly determine whether the second condition is satisfied, without need of confirming whether to perform an operation of determining whether the second condition is satisfied according to the fourth indication information sent by the network device.

Here, the fourth indication information includes dedicated indication information or the first information. In the above, the dedicated indication information refers to information specially used for indicating to determine whether the second condition is satisfied, and the dedicated indication information no longer carries other information contents. The first information is carried by first dedicated information; the third indication information is carried by second dedicated information, the first indication information is carried by third dedicated information. The first dedicated information, the second dedicated information and the third dedicated information are all information for the UE, or information for a UE group to which the UE belongs. The first dedicated information includes at least one of the following: a radio resource control (RRC) message, a media access control (MAC) control element (CE) and downlink control information (DCI). The second dedicated information includes any one of the following: an MAC CE, an RRC message and a physical layer signaling. The third dedicated information includes any one of the following: an RRC message, an MAC CE and DCI.

In an implementation of the present disclosure, the first indication information includes at least one of the following: an activation/deactivation identifier, a change indication identifier, an identifier for changed data duplication mode, an RLC entity identifier, a DRB identifier, a QoS flow identifier, a packet identifier, a packet data convergence protocol serial number (PDCP SN), an RLC SN, a logical channel identifier and a duplication object granularity. In the above, the duplication object granularity includes at least one of the following: a packet-based data duplication mode, a service-based data duplication mode, a QoS flow-based data duplication mode, a DRB-based data duplication mode and a UE-based data duplication mode.

As shown in FIG. 4, an optional processing flow of an indication method of data duplication mode applied to a network device of an implementation of the present disclosure includes:

Act S301, the network device sends first indication information to a UE, wherein the first indication information is used for indicating to change a data duplication mode.

In the implementation of the present disclosure, related description for the first indication information and the change in the data duplication mode is the same as that in act S201 in the implementation described above, which will not be repeated herein.

In some implementations, before the act S301 is performed, the method further includes:

S300*a*, the network device sends first information to the UE, wherein the first information is used for the UE to determine a second condition.

In the implementation of the present disclosure, description for the first information and the second condition is the same as that in act S301, which will not be repeated herein.

In some implementations, before the act S300*a* is performed, the method further includes:

Act S300*b*, the network device sends fourth indication information to the UE, wherein the fourth indication information is used for the UE to determine whether the second condition is satisfied.

Here, when the UE determines that the second condition needs to be determined to be met according to the fourth indication information, the UE determines the second condition according to the first information sent by the network device. When the second condition is satisfied, the UE sends third indication information to the network device, wherein the third indication information is used as a trigger condition triggering the network device to send the first indication information to the UE.

Figure 5:
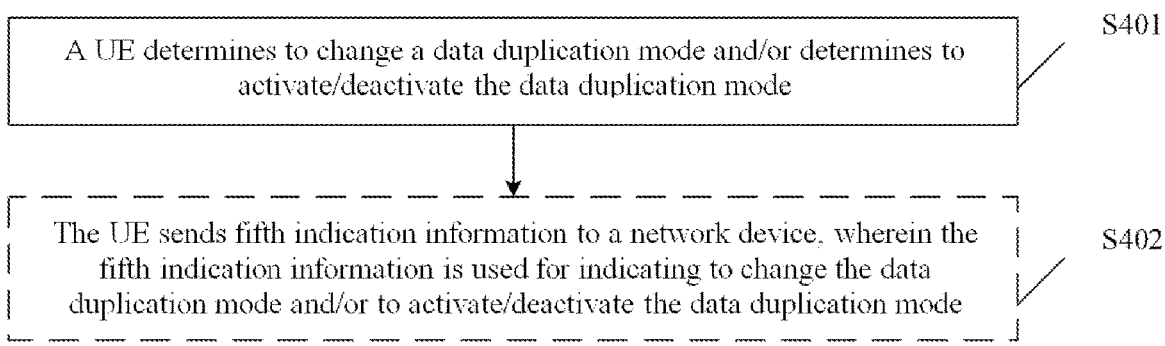
FIG. 5 is another schematic flowchart of an optional processing of an indication method of data duplication mode applied to a terminal device of an implementation of the present disclosure.

As shown in FIG. 5, another schematic flowchart of an optional processing of an indication method of data duplication mode applied to a terminal device provided by an implementation of the present disclosure includes the following act:

Act S401, a UE determines to change a data duplication mode and/or determines to activate/deactivate the data duplication mode.

Here, the UE independently determines to change the data duplication mode, and/or the UE independently determines to activate/deactivate the data duplication mode. In this process, a network device does not need to send any indication or notification related to the change in the data duplication mode and/or the activation/deactivation of data duplication mode to the UE.

In the implementation of the present disclosure, description related to the change in the data duplication mode and the activation/deactivation of the data duplication mode is the same as that in act S201, which will not be repeated herein.

In some implementations, after the act S401, the method further includes:

Act S402, the UE sends fifth indication information to the network device, wherein the fifth indication information is used for indicating to change the data duplication mode and/or to activate/deactivate the data duplication mode.

In an implementation of the present disclosure, the fifth indication information is carried by fourth dedicated information, wherein the fourth dedicated information is information for reporting the change in the data duplication mode and/or the activation/deactivation of the data duplication mode to the network device. The fourth dedicated information is information for the UE or information for a UE group to which the UE belongs.

Optionally, the fourth dedicated information includes at least one of the following: an MAC CE, an RRC message and a physical layer signaling. The fifth indication information includes at least one of the following:

an activation/deactivation identifier, a change indication identifier, an identifier for changed data duplication mode, an RLC entity identifier, a DRB identifier, a QoS flow identifier, a packet identifier, a PDCP SN, an RLC SN, a logical channel identifier and a duplication object granularity. The duplication object granularity includes at least one of the following: a packet-based data duplication mode, a service-based data duplication mode, a QoS flow-based data duplication mode, a DRB-based data duplication mode and a UE-based data duplication mode.

Figure 6:
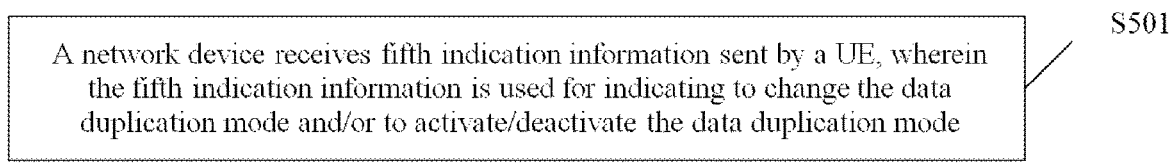
FIG. 6 is another schematic flowchart of an optional processing of an indication method of data duplication mode applied to a network device of an implementation of the present disclosure.

As shown in FIG. 6, another schematic flowchart of an optional processing of an indication method of data duplication mode applied to a network device provided by an implementation of the present disclosure includes the following act:

Act S501, the network device receives fifth indication information sent by a UE, wherein the fifth indication information is used for indicating to change a data duplication mode and/or to activate/deactivate the data duplication mode.

In the implementation of the present disclosure, description for the change in the data duplication mode and the activation/deactivation of the data duplication mode is the same as that in act S201, which will not be repeated herein.

In an implementation of the present disclosure, the fifth indication information is carried by fourth dedicated information, wherein the fourth dedicated information is information for reporting the change in the data duplication mode change and/or the activation/deactivation of the data duplication mode to the network device. The fourth dedicated information is information for the UE or information for a UE group to which the UE belongs.

Optionally, the fourth dedicated information includes at least one of the following: an MAC CE, an RRC message and a physical layer signaling. The fifth indication information includes at least one of the following:

an activation/deactivation identifier, a change indication identifier, an identifier for changed data duplication mode, an RLC entity identifier, a DRB identifier, a QoS flow identifier, a packet identifier, a PDCP SN, an RLC SN, a logical channel identifier and a duplication object granularity. In the above, the duplication object granularity includes at least one of the following: a packet-based data duplication mode, a service-based data duplication mode, a QoS flow-based data duplication mode, a DRB-based data duplication mode and a UE-based data duplication mode.

Figure 7:
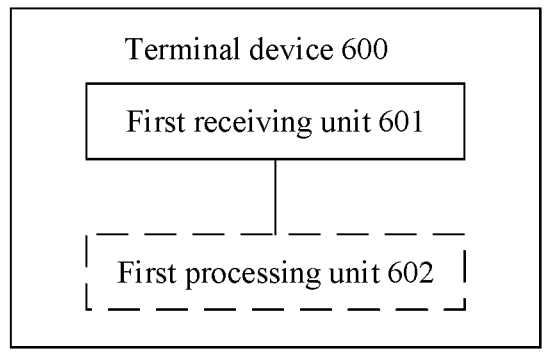
FIG. 7 is a schematic structural diagram of a terminal device of an implementation of the present disclosure.

As shown in FIG. 7, an optional structural diagram of a terminal device 600 provided by an implementation of the present disclosure includes a first receiving unit 601 configured to receive first indication information sent by a network device, wherein the first indication information is used for indicating to change a data duplication mode.

In an implementation of the present disclosure, the change in the data duplication mode includes:

that the data duplication mode is changed from a first activation/deactivation mode to a second activation/deactivation mode; or that the data duplication mode is changed from the second activation/deactivation mode to the first activation/deactivation mode; or that the data duplication mode is changed from a first sub-data duplication mode to a second sub-data duplication mode in the first activation/deactivation mode; or that the data duplication mode is changed from a third sub-data duplication mode to a fourth sub-data duplication mode in the second activation/deactivation mode.

In an implementation of the present disclosure, the first activation/deactivation mode includes a data duplication mode in which CA is combined with DC. The second activation/deactivation mode includes a data duplication mode of the CA or a data duplication mode of the DC. In the above, the first activation/deactivation mode includes at least one of a packet-based data duplication mode, a service-based data duplication mode, a QoS flow-based data duplication mode and a UE-based data duplication mode. The second activation/deactivation mode includes a DRB-based data duplication mode.

In the implementation of the present disclosure, the first indication information is sent by the network device when a first condition is satisfied. The first condition includes at least one of the following: that configuration of a data or signaling bearer is changed, that a service bearer is changed, that a service is changed, that the network device receives second indication information sent by a core network element, that the network device receives third indication information sent by the UE, that a service starts, that a service ends and that a change period of the data duplication mode is reached.

In an implementation of the present disclosure, both the second indication information and the third indication information are used for indicating the change in the data duplication mode between the network device and the UE. Or, the third indication information is used for indicating the activation/deactivation of the data duplication mode between the network device and the UE.

In the above, the third indication information is sent by the UE when a second condition is satisfied; and/or the UE sends the third indication information after the UE receives fourth indication information sent by the network device; and/or the UE sends the third indication information after the UE receives the fourth indication information sent by the network device and when the second condition is satisfied.

In an implementation of the present disclosure, the second condition includes any one of the following: that a service pattern is changed, that a service starts or a service ends, that a channel quality is less than a first threshold value, that the channel quality is greater than or equal to the first threshold value, that designated traffic to be transmitted is less than a second threshold value and that the designated traffic to be transmitted is greater than or equal to the second threshold value. The second condition is determined by the UE according to first information sent by the network device.

In an implementation of the present disclosure, the first information includes at least one of the following: a trigger condition, a reference object, a reference signal type, a measurement object and a threshold value.

In an implementation of the present disclosure, the terminal device further includes a first processing unit 602 configured to determine whether the second condition is satisfied according to the fourth indication information sent by the network device.

In the above, the fourth indication information includes dedicated indication information or the first information.

In an implementation of the present disclosure, the first information is carried by first dedicated information, wherein the first dedicated information includes any one of the following: an RRC message, an MAC CE and DCI.

In an implementation of the present disclosure, the third indication information is carried by second dedicated information, wherein the second dedicated information includes any one of the following: an MAC CE, an RRC message and a physical layer signaling.

In an implementation of the present disclosure, the first indication information is carried by third dedicated information, wherein the third dedicated information includes any one of the following: an RRC message, an MAC CE and DCI.

In an implementation of the present disclosure, the first indication information includes at least one of the following: an activation/deactivation identifier, a change indication identifier, an identifier for changed data duplication mode, an RLC entity identifier, a DRB identifier, a QoS flow identifier, a packet identifier, a PDCP SN, an RLC SN, a logical channel identifier and a duplication object granularity.

In the above, the duplication object granularity includes at least one of the following:
a packet-based data duplication mode, a service-based data duplication mode, a QoS flow-based data duplication mode, a DRB-based data duplication mode and a UE-based data duplication mode.

Figure 8:
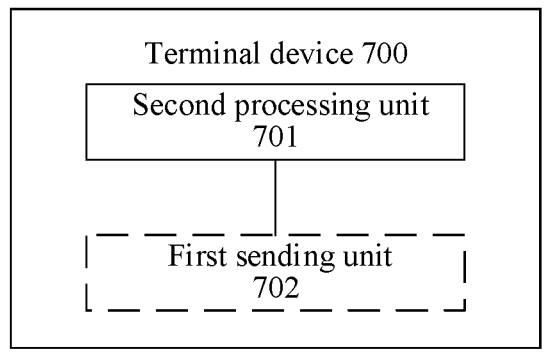
FIG. 8 is another schematic structural diagram of a terminal device of an implementation of the present disclosure.

As shown in FIG. 8, another optional structural diagram of a terminal device 700 provided by an implementation of the present disclosure includes:
a second processing unit 701 configured to determine to change a data duplication mode and/or determine to activate/deactivate the data duplication mode.

In an implementation of the present disclosure, the second processing unit 701 is configured to independently determine the change in the data duplication mode, and/or UE independently determines the activation/deactivation of the data duplication mode.

In an implementation of the present disclosure, the terminal device further includes:
a first sending unit 702 configured to send fifth indication information to a network device, wherein the fifth indication information is used for indicating to change the data duplication mode and/or to activate/deactivate the data duplication mode.

In an implementation of the present disclosure, the fifth indication information is carried by fourth dedicated information, wherein the fourth dedicated information includes any one of the following: an MAC CE, an RRC message and a physical layer signaling.

In an implementation of the present disclosure, the fifth indication information includes at least one of the following:
an activation/deactivation identifier, a change indication identifier, an identifier for changed data duplication mode, an RLC entity identifier, a DRB identifier, a QoS flow identifier, a packet identifier, a PDCP SN, an RLC SN, a logical channel identifier and a duplication object granularity. The duplication object granularity includes at least one of the following: a packet-based data duplication mode, a service-based data duplication mode, a QoS flow-based data duplication mode, a DRB-based data duplication mode and a UE-based data duplication mode.

Figure 9:
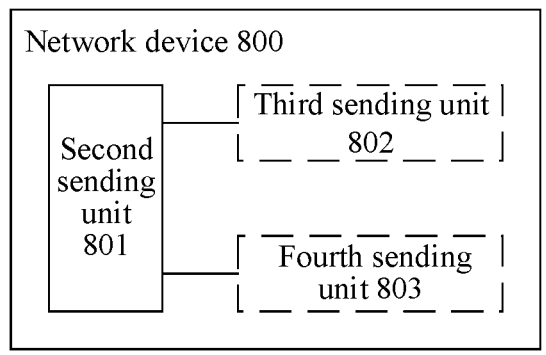
FIG. 9 is a schematic structural diagram of a network device of an implementation of the present disclosure.

As shown in FIG. 9, an optional structural diagram of a network device 800 provided by an implementation of the present disclosure includes:

a second sending unit 801 configured to send first indication information to a UE, wherein the first indication information is used for indicating to change a data duplication mode.

In an implementation of the present disclosure, the change in the data duplication mode includes:

that the data duplication mode is changed from a first activation/deactivation mode to a second activation/deactivation mode; or that the data duplication mode is changed from the second activation/deactivation mode to the first activation/deactivation mode; or that the data duplication mode is changed from a first sub-data duplication mode to a second sub-data duplication mode in the first activation/deactivation mode; or that the data duplication mode is changed from a third sub-data duplication mode to a fourth sub-data duplication mode in the second activation/deactivation mode.

In an implementation of the present disclosure, the first activation/deactivation mode includes a data duplication mode in which CA is combined with DC. The second activation/deactivation mode includes a data duplication mode of the CA or a data duplication mode of the DC.

In the above, the first activation/deactivation mode includes at least one of the following:

a packet-based data duplication mode, a service-based data duplication mode, a QoS flow-based data duplication mode and a UE-based data duplication mode. The second activation/deactivation mode includes a DRB-based data duplication mode.

In an implementation of the present disclosure, the second sending unit 801 sends the first indication information when a first condition is satisfied.

In the above, the first condition includes at least one of the following: that configuration of a data or signaling bearer is changed, that a service bearer is changed, that a service is changed, that the network device receives second indication information sent by a core network element, that the network device receives third indication information sent by the UE, that a service starts, that a service ends and that a change period of the data duplication mode is reached.

In an implementation of the present disclosure, both the second indication information and the third indication information can be used for indicating the change in the data duplication mode between the network device and the UE. Or, the third indication information is used for indicating the activation/deactivation of the data duplication mode between the network device and the UE.

In an implementation of the present disclosure, the third indication information is sent when a second condition is satisfied; and/or the third indication information is sent after the UE receives fourth indication information sent by the network device; and/or the third indication information is sent after the UE receives the fourth indication information sent by the network device and when the second condition is satisfied.

In an implementation of the present disclosure, the second condition includes any one of the following:

that a service pattern is changed, that a service starts or a service ends, that a channel quality is less than a first threshold value, that the channel quality is greater than or equal to the first threshold value, that designated traffic to be transmitted is less than a second threshold value and that the designated traffic to be transmitted is greater than or equal to the second threshold value.

In an implementation of the present disclosure, the network device further includes:

a third sending unit 802 configured to send first information to the UE, wherein the first information is used for the UE to determine the second condition.

In the above, the first information includes at least one of the following:

a trigger condition, a reference object, a reference signal type, a measurement object and a threshold value.

In an implementation of the present disclosure, the network device further includes:

a fourth sending unit 803 configured to send the fourth indication information to the UE, wherein the fourth indication information is used for the UE to determine whether the second condition is satisfied.

In an implementation of the present disclosure, the fourth indication information includes dedicated indication information or the first information.

In the above, the first information is carried by first dedicated information, wherein the first dedicated information includes at least one of the following: an RRC message, an MAC CE and DCI.

The third indication information is carried by second dedicated information, wherein the second dedicated information includes any one of the following: an MAC CE, an RRC message and a physical layer signaling.

The first indication information is carried by third dedicated information, wherein the third dedicated information includes any one of the following: an RRC message, an MAC CE and DCI.

In an implementation of the present disclosure, the first indication information includes at least one of the following:

an activation/deactivation identifier, a change indication identifier, an identifier for changed data duplication mode, an RLC entity identifier, a DRB identifier, a QoS flow identifier, a packet identifier, a PDCP SN, an RLC SN, a logical channel identifier and a duplication object granularity. On the above, the duplication object granularity includes at least one of the following:

a packet-based data duplication mode, a service-based data duplication mode, a QoS flow-based data duplication mode, a DRB-based data duplication mode and a UE-based data duplication mode.

Figure 10:
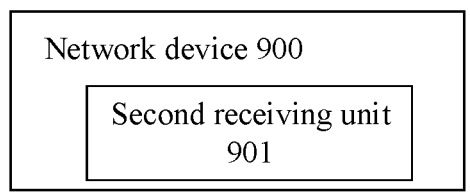
FIG. 10 is another schematic structural diagram of a network device of an implementation of the present disclosure.

As shown in FIG. 10, another optional structural diagram of a network device 900 provided by an implementation of the present disclosure includes:

a second receiving unit 901 configured to receive fifth indication information sent by a UE, wherein the fifth indication information is used for indicating to change a data duplication mode and/or to activate/deactivate the data duplication mode.

In an implementation of the present disclosure, the fifth indication information is carried by fourth dedicated information, wherein the fourth dedicated information includes any one of the following: an MAC CE, an RRC message and a physical layer signaling.

In an implementation of the present disclosure, the fifth indication information includes at least one of the following:

an activation/deactivation identifier, a change indication identifier, an identifier for changed data duplication mode, an RLC entity identifier, a DRB identifier, a QoS flow identifier, a packet identifier, a PDCP SN, an RLC SN, a logical channel identifier and a duplication object granularity.

In the above, the duplication object granularity includes at least one of the following:

a packet-based data duplication mode, a service-based data duplication mode, a QoS flow-based data duplication mode, a DRB-based data duplication mode and a UE-based data duplication mode.

An implementation of the present disclosure further provides a terminal device, which includes a processor and a memory configured to store a computer program which is runnable on the processor, wherein the processor is configured to execute the acts of the above indication method of data duplication mode executed by the terminal device when running the computer program.

An implementation of the present disclosure further provides a network device, which includes a processor and a memory configured to store a computer program which is runnable on the processor; wherein the processor is configured to execute the acts of the above indication method of data duplication mode executed by the network device when running the computer program.

Figure 11:
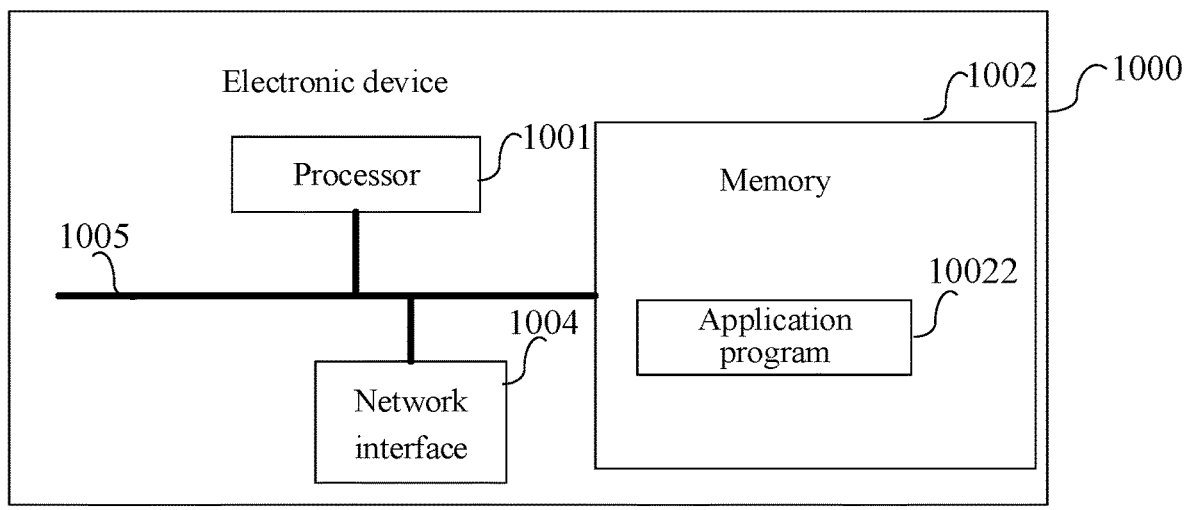
FIG. 11 is a schematic structural diagram of hardware of an electronic device of an implementation of the present disclosure.

FIG. 11 is a schematic structural diagram of hardware of an electronic device (network device or terminal device) of an implementation of the present disclosure. The electronic device 1000 includes at least one processor 1001, a memory 1002 and at least one network interface 1004. Various components in the electronic device 1000 are coupled together by a bus system 1005. It can be understood that the bus system 1005 is used for implementing connection and communication between these components. In addition to a data bus, the bus system 1005 includes a power bus, a control bus, and a status signal bus. However, for the sake of clarity, all kinds of buses are marked as the bus system 1005 in FIG. 11.

It can be understood that the memory 1002 may be a volatile memory or a non-volatile memory or both. In the above, the non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disk, or a compact disc read-only memory (CD-ROM). The magnetic surface memory may be a magnetic disk memory or a magnetic tape memory. The volatile memory may be a random access memory (RAM) which serves as an external cache. By way of exemplary but not restrictive illustrations, many forms of RAMs, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a SyncLink dynamic random access memory (SLDRAM), a direct Rambus random access memory (DRRAM), are available. The memory 1002 described in the implementation of the present disclosure is intended to include, but be not limited to, these and any other suitable types of memories.

The memory 1002 in the implementation of the present disclosure is configured to store various types of data to support operations of the electronic device 1000. Examples of such data include any computer program to operate on the electronic device 1000, such as an application program 10022. A program for implementing the methods of the implementations of the present disclosure may be included in the application program 10022.

Methods disclosed in above implementations of the present disclosure may be applied in the processor 1001 or implemented by the processor 1001. The processor 1001 may be an integrated circuit chip with a signal processing capability. In an implementation process, the acts of the methods described above may be accomplished by integrated logic circuits of hardware in the processor 1001 or instructions in a form of software. The above-mentioned processor 1001 may be a general-purpose processor, a digital signal processor (DSP), or other programmable logic device, a discrete gate or a transistor logic device, a discrete hardware component, etc. The processor 1001 may implement or execute various methods, acts and logical block diagrams disclosed in the implementations of the present disclosure. The general purpose processor may be a microprocessor or any conventional processor or the like. The acts of the methods disclosed in combination with the implementations of the present disclosure may be directly embodied to be executed and accomplished by a hardware decoding processor or by a combination of hardware and software modules in a decoding processor. The software modules may be located in a storage medium, which is located in the memory 1002. The processor 1001 reads information in the memory 1002 and accomplishes the acts of the aforementioned methods in combination with hardware thereof.

In an exemplary implementation, the electronic device 1000 may be implemented by one or more application specific integrated circuits (ASICs), DSPs, programmable logic devices (PLDs), complex programmable logic devices (CPLDs), FPGAs, general purpose processors, controllers, MCUs, MPUs or other electronic components, for executing the aforementioned methods.

An implementation of the present disclosure further provides a computer readable storage medium configured to store a computer program.

Optionally, the computer readable storage medium may be applied to a network device in an implementation of the present disclosure, and the computer program enables a computer to perform the corresponding processes implemented by a network device in various methods in the implementations of the present disclosure, which will not be repeated herein for sake of brevity.

Optionally, the computer readable storage medium may be applied to a terminal device in an implementation of the present disclosure, and the computer program enables the computer to perform the corresponding processes implemented by a terminal device in various methods in the implementations of the present disclosure, which will not be repeated herein for sake of brevity.

It should be noted that in the above implementations of the present disclosure, "/" means "or"; AB means A or B.

The present disclosure is described with reference to flowcharts and/or block diagrams of methods, devices (systems), and computer program products according to the implementations of the present disclosure. It should be understood that each flow and/or block in the flowcharts and/or block diagrams, and combinations of flows and/or blocks in the flowcharts and/or block diagrams can be implemented by computer program instructions. These computer program instructions may be provided to a processor of a general purpose computer, a special purpose computer, an embedded processor or other programmable data processing devices to generate a machine, such that the instructions which are executed by the processor of the computer or other programmable data processing devices can generate means for implementing functions specified in one or more flows of the flowcharts and/or in one or more blocks of the block diagrams.

These computer program instructions may also be stored in a computer-readable memory that can direct the computer or other programmable data processing devices to operate in a specific manner, such that the instructions stored in the computer-readable memory can generate an article of manufacture including instruction means that implement the functions specified in one or more flows of the flowcharts and/or in one or more blocks of the block diagrams.

These computer program instructions may also be loaded onto the computer or other programmable data processing devices, such that a series of operational acts can be performed on the computer or other programmable devices to generate a computer-implemented process, thus the instructions executed on the computer or other programmable devices provide acts for implementing the functions specified in one or more flows of the flowcharts and/or in one or more blocks of the block diagrams.

The above descriptions are only preferred implementations of the present disclosure and are not intended to define the protection scope of the present disclosure. Any modification, equivalent substitution and improvement made within the spirit and principle of the present disclosure shall be covered by the protection scope of the present disclosure.

What is claimed is:

1. A method for indicating a data duplication mode, comprising:
   receiving, by a terminal device, first indication information sent by a network device, wherein the first indication information is configured to indicate change of a data duplication mode;
   wherein the change of the data duplication mode comprises that the data duplication mode is changed from a data duplication mode in which carrier aggregation (CA) is combined with dual connectivity (DC) to a data duplication mode of CA or a data duplication mode of DC; or the data duplication mode is changed from the data duplication mode of CA or the data duplication mode of DC to the data duplication mode in which CA is combined with DC;
   wherein the first indication information is carried by a media access control (MAC) control element (CE), and the first indication information comprises an activation/deactivation identifier, a data resource bearer (DRB) identifier, and a logical channel identifier.

2. A method for indicating a data duplication mode, comprising:
   sending, by a network device, first indication information to a terminal device, wherein the first indication information is configured to indicate change of a data duplication mode;
   wherein the change of the data duplication mode comprises that the data duplication mode is changed from a data duplication mode in which carrier aggregation (CA) is combined with dual connectivity (DC) to a data duplication mode of CA or a data duplication mode of DC; or the data duplication mode is changed from the data duplication mode of CA or the data duplication mode of DC to the data duplication mode in which CA is combined with DC;
   wherein the first indication information is carried by a media access control (MAC) control element (CE), and the first indication information comprises an activation/deactivation identifier, a data resource bearer (DRB) identifier, and a logical channel identifier.

3. A terminal device, comprising: a processor and a memory configured to store a computer program that is runnable on the processor, wherein the processor is configured to receive first indication information sent by a network device, wherein the first indication information is configured to indicate change of a data duplication mode;
   wherein the change of the data duplication mode comprises that the data duplication mode is changed from a data duplication mode in which carrier aggregation (CA) is combined with dual connectivity (DC) to a data duplication mode of CA or a data duplication mode of DC; or the data duplication mode is changed from the data duplication mode of CA or the data duplication mode of DC to the data duplication mode in which CA is combined with DC;
   wherein the first indication information is carried by a media access control (MAC) control element (CE), and the first indication information comprises an activation/deactivation identifier, a data resource bearer (DRB) identifier, and a logical channel identifier.

* * * * *